United States Patent
Tai et al.

(10) Patent No.: US 9,995,932 B2
(45) Date of Patent: Jun. 12, 2018

(54) HEAD-UP DISPLAY WITH VARIABLE FOCAL LENGTH

(71) Applicant: INDUSTRIAL TECHNOLOGY RESEARCH INSTITUTE, Hsin-Chu (TW)

(72) Inventors: Ching-I Tai, Tainan (TW); Kao-Der Chang, Taichung (TW); Min-Lang Hsieh, Hsinchu County (TW); Jhen-Nan Gu, Taipei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 48 days.

(21) Appl. No.: 15/392,277

(22) Filed: Dec. 28, 2016

(65) Prior Publication Data

US 2018/0095277 A1 Apr. 5, 2018

(30) Foreign Application Priority Data

Oct. 4, 2016 (TW) .............................. 105132097 A

(51) Int. Cl.
*G02B 27/14* (2006.01)
*G09G 5/00* (2006.01)
(Continued)

(52) U.S. Cl.
CPC .......... *G02B 27/0101* (2013.01); *B60K 35/00* (2013.01); *G02B 27/0149* (2013.01);
(Continued)

(58) Field of Classification Search
CPC ............... G02B 27/01; G02B 27/0101; G02B 27/0149; G02B 27/0179; G02B 2027/014
(Continued)

(56) References Cited

U.S. PATENT DOCUMENTS 4,613,200 A * 9/1986 Hartman ............ G02B 27/0103
345/7
5,357,372 A 10/1994 Chen et al.
(Continued)

FOREIGN PATENT DOCUMENTS

CN 102445755 A 5/2012
TW 214583 B 10/1993
(Continued)

OTHER PUBLICATIONS

Ridha Ben-Mrad et al., A MEMS Micromirror Based Head-Up Display System, Symposium on Design, Test, Integration and Packaging of MEMS/MOEMS, IEEE, 2015.
(Continued)

*Primary Examiner* — William Choi
(74) *Attorney, Agent, or Firm* — Locke Lord LLP; Tim Tingkang Xia, Esq.

(57) ABSTRACT

A head-up display with variable focal length includes a projector which provides a beam with image, a magnifier lens module which is disposed on the route of the beam, and an array of lens which is movably disposed between the projector and the magnifier lens module. The beam forms an inter-image after passing the array of lens, then forms a virtual image after passing the magnifier lens module. To change the position of the virtual image, adjust the relative position between the array of lens and the magnifier lens module. A dispersion angle of the array of lens is θd, a magnification of the magnifier lens module is M, a distance between the virtual image and user's eyes is VID, a visible range of user's eyes is Et, and satisfies the relationship as following: $\theta d = M*2*\cot^{-1}(2VID/Et)$.

7 Claims, 6 Drawing Sheets

(51) Int. Cl.
  *G02B 27/01* (2006.01)
  *G02B 27/02* (2006.01)
  *B60K 35/00* (2006.01)
(52) U.S. Cl.
  CPC .... *G02B 27/027* (2013.01); *B60K 2350/1072* (2013.01); *B60K 2350/2052* (2013.01); *B60K 2350/352* (2013.01); *G02B 2027/0141* (2013.01); *G02B 2027/0154* (2013.01)
(58) Field of Classification Search
  USPC .................................. 359/630; 345/7, 9
  See application file for complete search history.

(56) References Cited

U.S. PATENT DOCUMENTS

| | | | |
|---|---|---|---|
| 5,379,132 | A | 1/1995 | Kuwayama et al. |
| 6,163,309 | A | 12/2000 | Weinert |
| 6,504,518 | B1 | 1/2003 | Kuwayama et al. |
| 8,351,123 | B2 | 1/2013 | Moussa et al. |
| 8,628,196 | B2 | 1/2014 | Song et al. |
| 8,724,225 | B2 | 5/2014 | Kang et al. |
| 8,792,177 | B2 | 7/2014 | Nakamura et al. |
| 9,164,283 | B2 | 10/2015 | Chiang et al. |
| 9,268,135 | B2 | 2/2016 | Jan et al. |
| 2011/0267701 | A1 | 11/2011 | Moussa et al. |
| 2012/0188391 | A1 | 7/2012 | Smith |

FOREIGN PATENT DOCUMENTS

| | | |
|---|---|---|
| TW | 201107164 A | 3/2011 |
| TW | 201219829 A | 5/2012 |
| TW | 201321795 A | 6/2013 |
| TW | 201533473 A | 9/2015 |
| TW | I506299 B | 11/2015 |
| TW | 201546490 A | 12/2015 |
| WO | 2014016577 A2 | 1/2014 |

OTHER PUBLICATIONS

Bernard Kress et al., Digital combiner achieves low cost and high reliability for head-up display applications, SPIE Newsroom, 2009.
R. J. Kiefer, Quantifying HUD pedestrian detection benefits for older drivers, General Motors North American Operations Safety Center, United States, 1995, 428-437.
Chi-Hung Lee et al., The design and fabrication of an optical diffuser for head-up displays, Proc. SPIE, 2015, vol. 9302.
Malcolm Homan, The use of optical waveguides in head up display (HUD) applications, Proc. SPIE, 2013, vol. 8736.
Sheng Liu et al., An Optical See-Through Head Mounted Display with Addressable Focal Planes, IEEE International Symposium on Mixed and Augmented Reality, 2008, 33-42.
Intellectual Property Office Ministry of Economic Affairs, R.O.C., "Office Action", Sep. 27, 2017, Taiwan.

\* cited by examiner

HEAD-UP DISPLAY WITH VARIABLE FOCAL LENGTH

CROSS REFERENCE TO RELATED APPLICATION

This application also claims priority to Taiwan Patent Application No. 105132097 filed in the Taiwan Patent Office on Oct. 4, 2016, the entire content of which is incorporated herein by reference.

TECHNICAL FIELD

The present disclosure relates to a head-up display, and more particularly to a head-up display with variable focal length.

BACKGROUND

Nowadays, head-up displays (HUD) are becoming more and more popular because of their practical ergonomic designs in view of luminance/contrast, field of view, variable focal length, and so on. Nevertheless, the HUDs that are current available on the market are generally designed to use conventional lens sets or light-emitting diode (LED) segment displays to achieve the effect of image projection and field-of-view magnification.

Despite their low cost and ease to install, the HUDs which form simple patterns by the use of LED segment displays and then project the simple patterns on windshield glasses can easily cause eye fatigue to users since the displayed pattern are closely attached on the windshield glasses that the users will need to adjust their focal point from the far pavement to the near windshield glass.

The combination of projector and magnifier lens set is adopted and good for enable a user to focus on a remote object by bare eye. However, as it is known that a potential cause of visual fatigue in driving is repeated changes between near and far viewing, and as the projection of the virtual image that is produced by the use of the aforesaid projector combination may not be adjustable in response to vehicle speed change, visual fatigue to the driver can easily be triggered. Although such required focal length adjustability can be achieved by the use of lens set with specifically designed structure or by the change of curvature, the consequence is that the projector with such complicated curve surface is difficult to manufacture, and thus the yield rate of such projector is poor. In an other word, although the monitor using the aforesaid combination of projector and magnifier lens set can have farther range of display and better display effect, driver of a vehicle that may not be maintaining at a constant speed will still have to change his/her focus constantly and continuously while viewing the monitor.

Therefore, it is in need of a head-up display with variable focal length that can enable all the important driving information to be visible to the driver without blind spot, and can enable the position of projection to be determined according to the essentiality of data and vehicle speed.

SUMMARY

In an embodiment, the present disclosure provides a head-up display with variable focal length, comprising:
a projector, for providing a beam with image;
a magnifier lens module, disposed on the route of the beam; and
an array of lens, movably disposed between the projector and the magnifier lens module;
wherein, the beam forms an inter-image after passing the array of lens, then forms a virtual image after passing the magnifier lens module; the position of the virtual image is changeable by adjusting the relative position between the array of lens and the magnifier lens module; and by defining a dispersion angle of the array of lens to be $\theta d$, a magnification of the magnifier lens module to be M, a distance between the virtual image and user's eyes to be VID, and a visible range of user's eyes to be Et, the operation of the head-up display satisfies the relationship defined by the following equation:

$$\theta d = M * 2 * \cot^{-1}(2VID/Et).$$

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
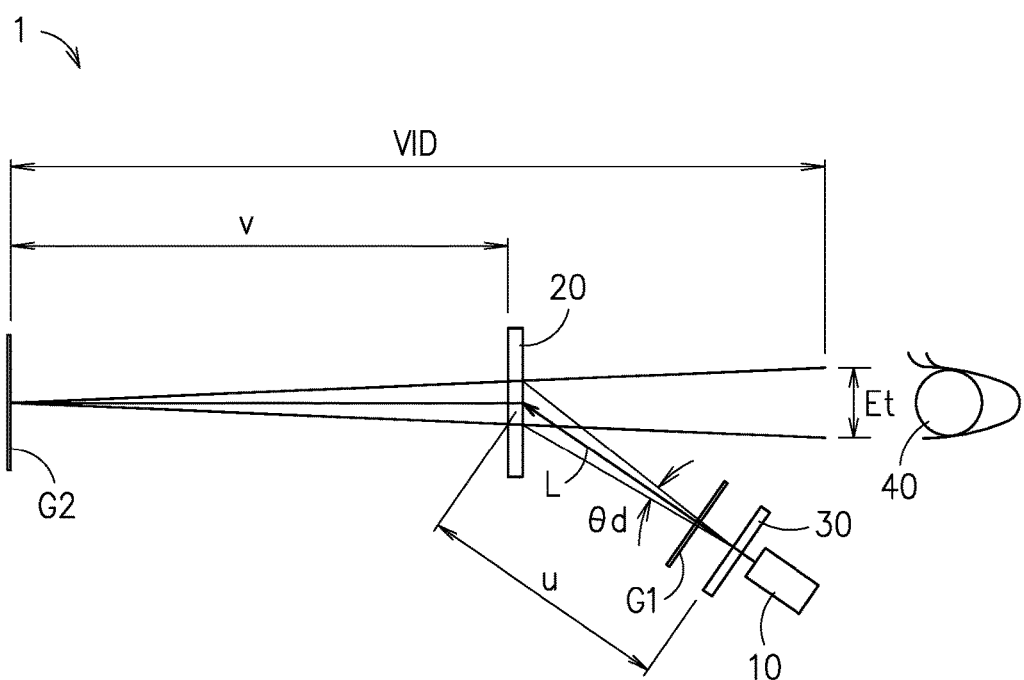
FIG. 1 is a schematic view of a head-up display with variable focal length according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a schematic view of a head-up display with variable focal length according to an embodiment of the present disclosure. In FIG. 1, a head-up display with variable focal length 1 is disclosed, which comprises: a projector 10, a magnifier lens module 20 and an array of lens 30.

The projector 10 is used for providing a beam L with image, whereas the magnifier lens module 20 is disposed on the route of the beam L and can be a device selected from the group consisting of: a Fresnel lens, a concave mirror, a convex lens, and the combination thereof. In addition, the array of lens 30 is movably disposed between the projector 10 and the magnifier lens module 20. In an embodiment, the beam L forms an inter-image G1 after passing the array of lens 30, then forms a virtual image G2 after passing the magnifier lens module 20; by defining the distance between the virtual image G2 and the magnifier lens module 20 to be v and the distance between the array of lens 30 and the magnifier lens module 20 to be u, the magnification of the magnifier lens module 20 is defined by the following equation: M=v/u.; and by defining a dispersion angle of the array of lens 30 to be θd, a magnification of the magnifier lens module 20 to be M, a distance between the virtual image G2 and user's eyes 40 to be VID, and a visible range of user's eyes 40 to be Et, the operation of the head-up display satisfies the relationship defined by the following equation: θd=M*2*cof$^{-1}$ (2VID/Et).

Figure 2:
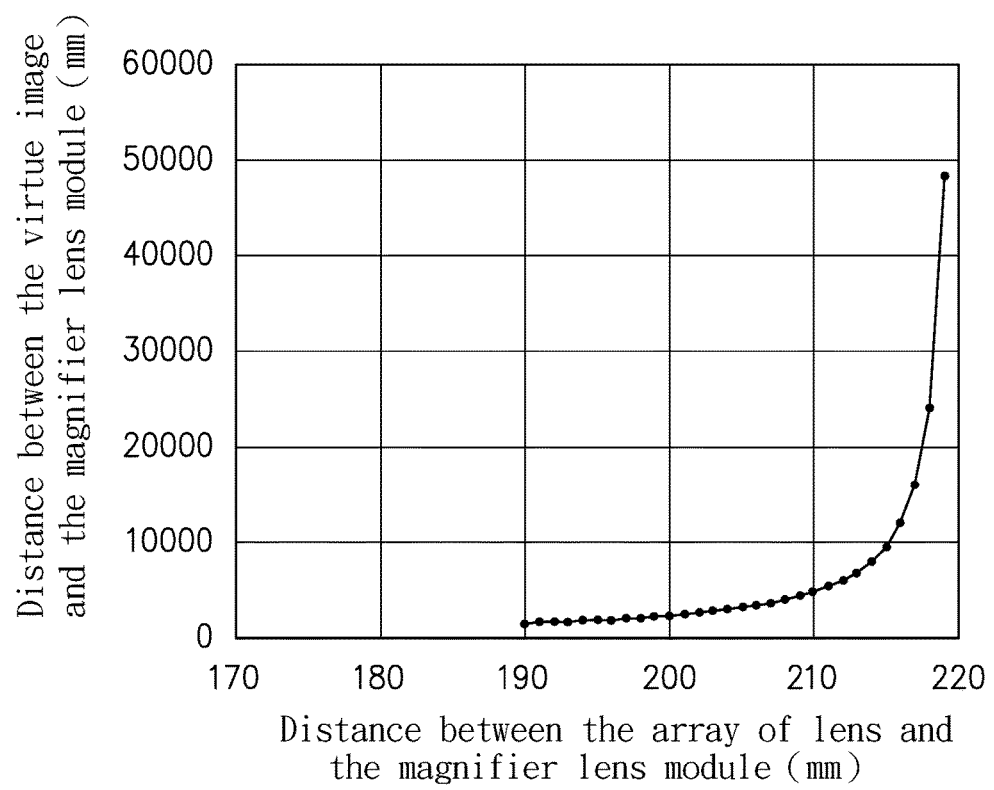
FIG. 2 is a diagram showing the distance relationship between an array of lens, a magnifier lens module, and the resulted virtual image when the focus of the magnifier lens module is 220 mm.

Please refer to FIG. 2, which is a diagram showing the distance relationship between an array of lens, a magnifier lens module, and the resulted virtual image when the focus of the magnifier lens module is 220 mm. In FIG. 2, the distance between the array of lens 30 and the magnifier lens module 20 is represented as u on the horizontal coordinate, and the distance between the virtual image G2 and the magnifier lens module 20 is represented as v on the vertical coordinate. It is noted that the larger the distance between the array of lens 30 and the magnifier lens module 20 is, the larger the distance between the virtual image G2 and the magnifier lens module 20 will be. In an experiment, when the distance u between the array of lens 30 and the magnifier lens module 20 is 175 mm, the corresponding distance v between the virtual image G2 and the magnifier lens module 20 is 1050 mm, but when the distance u between the array of lens 30 and the magnifier lens module 20 is 200 mm, which is larger, the corresponding distance v between the virtual image G2 and the magnifier lens module 20 will increase to 4200 mm. Moreover, the magnification M of the magnifier lens module 20 is ranged and defined by the following equation: 1<M<30, which can prevent severe image deformation; and in order to ensure the user's eye 40 to be able to see clear image under sunshine, the index of reflection R of the magnifier lens module 20 is ranged and defined by the following equation: 30%<R<70%. Thereby, the curvature of the magnifier lens module 20 can be decided accordingly, and then the structure of the array of lens 30 can be determined and designed correspondently.

Figure 3:
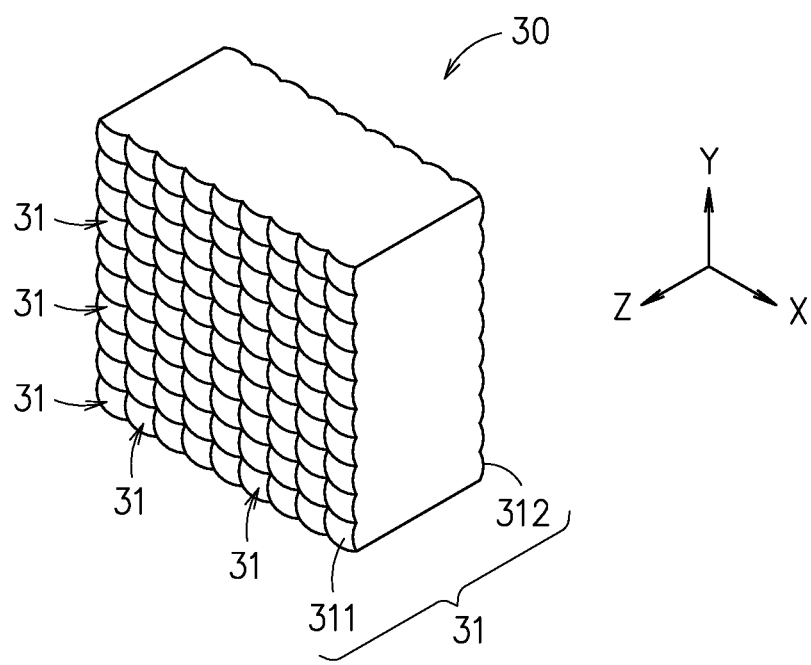
FIG. 3 is a schematic view of an array of lens used in a head-up display with variable focal length of the present disclosure.
Figure 4:
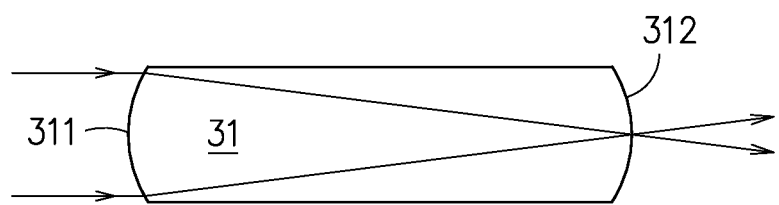
FIG. 4 is a schematic view of a lens unit in the array of lens of FIG. 3.
Figure 5:
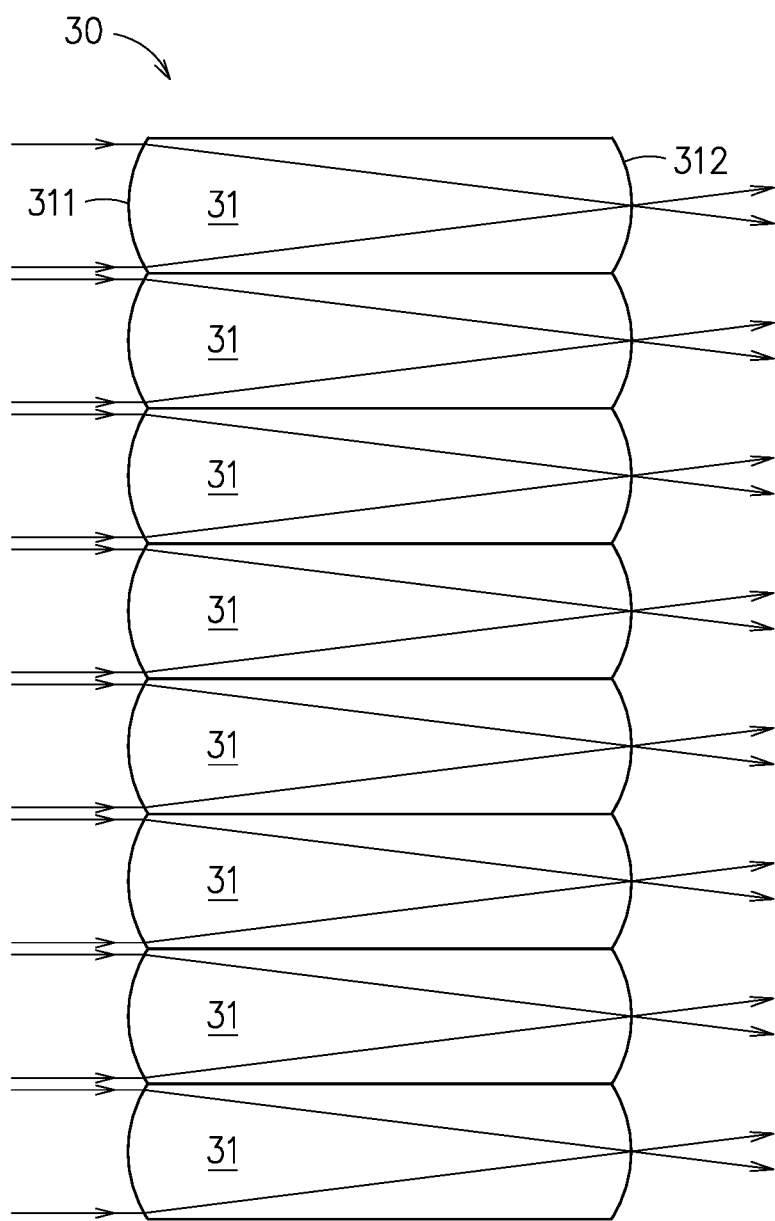
FIG. 5 is a schematic diagram showing the spatial distribution on a light-exiting surface of the lens array of FIG. 3 when the light-exiting surface is aligned at the focal point.

In FIG. 3 to FIG. 5, an array of lens that is used in a head-up display with variable focal length of the present disclosure is disclosed. In this embodiment, the array of lens 30 is composed of a plurality of lens units 31; and each of the plural lens units 31 is formed with a light-entering surface 311 and a light-exiting surface 312 in a manner that the light-entering surface 311 and the light-exiting surface 312 are formed with the same radius of curvature but opposite direction, while the focal plane of the light-entering surface 311 is the light-exiting surface 312, and vice versa. Thereby, beams entering the array of lens 30 can focus on the light-exiting surface 312, by that the loss in incidence efficiency and the improvement of the etendue can be prevented. There is no restriction regarding to the shape, cross-section size, amount and arrangement of the plural lens units 31. For instance, the cross section of one such lens units 31 can be formed as a rectangle, as that shown in FIG. 3, or a triangle, a polygon or even a circle. It is noted that the plural lens units 31 are arranged into the array of lens 30 of a specific size that is determined according to the diameter of the incident beam L and the shape of the lens unit 31. For instance, when the diameter of the incident beam L is 20~200 μm, the period of the lens unit 31 is then being defined within 20~200 μm for preventing diffraction and energy loss.

Figure 6:
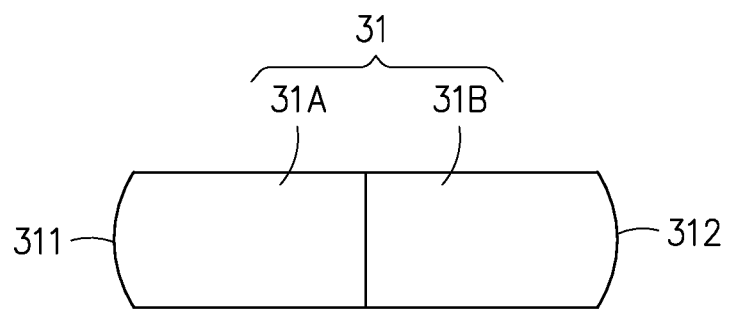
FIG. 6 and FIG. 7 are schematic diagrams showing different arrays of lens used in a head-up display with variable focal length of the present disclosure.
Figure 7:
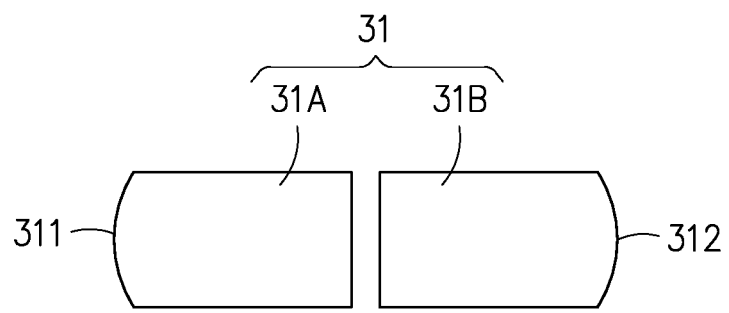

As shown in FIG. 6 and FIG. 7, the lens unit 31 is composed of a first lens 31A and a second lens 31B, whereas there is a light-entering surface 311 to be formed on one end of the first lens 31A while allowing an opposite end of the first lens 31A to be formed into a planar surface; and there is a light-exiting surface 312 to be formed on one end of the second lens 31B while allowing an opposite end of the second lens 31B to be formed into a planar surface; moreover, the first lens 31A and the second lens 31B are arranged facing each other by their planar surfaces while allowing the light-entering surface 311 and the light-exiting surface 312 to be disposed at the two opposite ends of the lens unit 31. In FIG. 6, the first lens 31A is disposed engaging to the second lens 31B, and in FIG. 7, the first lens 31A is disposed spacing from the second lens 31B by a distance. Referring to FIG. 4, FIG. 6 and FIG. 7, the lens unit 31 of FIG. 4 adopts an integral design, which those shown in FIG. 6 and FIG. 7 are two-piece design. Nevertheless, when one of the light-entering surface 311 and the light-exiting surface 312 is a planar surface, the beam exiting the light-exiting surface 312 may not be able to focus on the designed focal point, which will cause the optical performance to decrease, but in a condition when high optical performance is not highly emphasized, such design with one of the light-entering surface 311 and the light-exiting surface 312 to be a planar surface can be used in the embodiment shown in FIG. 1.

Figure 8:
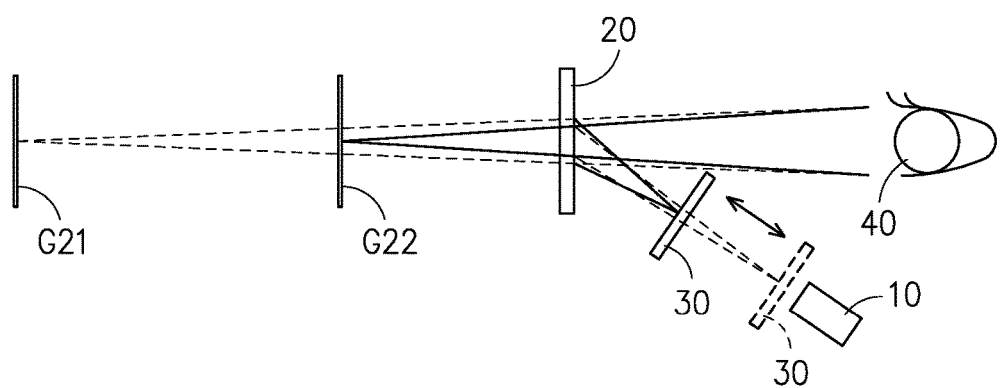
FIG. 8 is a schematic diagram showing how the position of the virtual image can be adjusted and changed in the embodiment of FIG. 1.

Please refer to FIG. 8, which is a schematic diagram showing how the position of the virtual image can be adjusted and changed in the embodiment of FIG. 1. By defining a dispersion angle of the array of lens 30 to be θd, a magnification of the magnifier lens module 20 to be M, a distance between the virtual image G2 and user's eyes 40 to be VID, and a visible range of user's eyes 40 to be Et, the operation of the head-up display satisfies the relationship defined by the following equation: θd=M*2*cof$^{-1}$ (2VID/Et).

According to the optical imaging principle: 1/u+1/v=1/f, whereas f is the focus length of the magnifier lens module 20, when the array of lens 30 is disposed farther from the magnifier lens module 20, the virtual image G21 will be formed at a position far from the user's eyes 40, as indicated by the dotted line; on the other hand, when the array of lens 30 is disposed closer to the magnifier lens module 20, the virtual image G22 will be formed at a position near to the user's eyes 40, as indicated by the solid line. Accordingly, the position of the virtual image G2 can be adjusted and changed by changing the relative positions between the array of lens 30 and the magnifier lens module 20. Assuming the average distance between the left eye and the right eye of a driver is 12 cm, for enabling the driver to see a clear image, the magnification M should be smaller than 30, while the virtual image G2 should be projected and formed in front of the hood of the vehicle by more than 2 m, and thus according to θd=M*2*cof$^{-1}$ (2VID/Et), θd is larger than 1.8 degree.

To sum up, a head-up display with variable focal length of the present disclosure, which is including a projector, an array of lens and a magnifier lens module, is a low cost device with simple structure capable of ensuring a satisfactory image definition without having significant design change in the magnifier lens module and the projector.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A head-up display with variable focal length, comprising:
   a projector, for providing a beam with image;
   a magnifier lens module, disposed on the route of the beam; and
   an array of lens, movably disposed between the projector and the magnifier lens module;
   wherein, the beam forms an inter-image after passing the array of lens, then forms a virtual image after passing the magnifier lens module; the position of the virtual image is changeable by adjusting the relative position between the array of lens and the magnifier lens module; and by defining a dispersion angle of the array of lens to be θd, a magnification of the magnifier lens module to be M, a distance between the virtual image and user's eyes to be VID, and a visible range of user's eyes to be Et, the operation of the head-up display satisfies the relationship defined by the following equation: θd=M*2*cof$^{-1}$ (2VID/Et).

2. The head-up display with variable focal length of claim 1, wherein by defining the distance between the virtual image and the magnifier lens module to be v and the distance between the array of lens and the magnifier lens module to be u, the magnification of the magnifier lens module is defined by the following equation: M=v/u.

3. The head-up display with variable focal length of claim 1, wherein the dispersion angle θd of the array of lens is larger than 1.8 degree.

4. The head-up display with variable focal length of claim 1, wherein the magnification M of the magnifier lens module is ranged and defined by the following equation: 1<M<30.

5. The head-up display with variable focal length of claim 1, wherein the index of reflection R of the magnifier lens module is ranged and defined by the following equation: 30%<R<70%.

6. The head-up display with variable focal length of claim 1, wherein the magnifier lens module is a device selected from the group consisting of: a Fresnel lens, a concave mirror, a convex lens, and the combination thereof.

7. The head-up display with variable focal length of claim 1, wherein the array of lens is composed of a plurality of lens units, and each of the plural lens units is formed with a light-entering surface and a light-exiting surface in a manner that the light-entering surface and the light-exiting surface are formed with the same radius of curvature but opposite direction, while the focal plane of the light-entering surface is the light-exiting surface and vice versa.

* * * * *